(12) United States Patent
Nishikido et al.

(10) Patent No.: US 10,076,983 B2
(45) Date of Patent: Sep. 18, 2018

(54) COVER MATERIAL FOR VEHICLE SEAT SHEET

(71) Applicant: Suminoe Textile Co., Ltd., Osaka (JP)

(72) Inventors: Hiroshi Nishikido, Osaka (JP); Jiro Nishimura, Osaka (JP)

(73) Assignee: SUMINOE TEXTILE CO., LTD., Osaka (JP)

( * ) Notice: Subject to any disclaimer, the term of this patent is extended or adjusted under 35 U.S.C. 154(b) by 52 days.

(21) Appl. No.: 15/308,476

(22) PCT Filed: May 1, 2015

(86) PCT No.: PCT/JP2015/063060
§ 371 (c)(1),
(2) Date: Nov. 2, 2016

(87) PCT Pub. No.: WO2015/170675
PCT Pub. Date: Nov. 12, 2015

(65) Prior Publication Data
US 2017/0088028 A1    Mar. 30, 2017

(30) Foreign Application Priority Data

May 7, 2014    (JP) ................. 2014-095956

(51) Int. Cl.
*B32B 3/02* (2006.01)
*B60N 2/58* (2006.01)
*D05B 81/00* (2006.01)

(52) U.S. Cl.
CPC ........... *B60N 2/5883* (2013.01); *D05B 81/00* (2013.01)

(58) Field of Classification Search
CPC .... Y10T 428/24207; D03D 3/00; D03D 3/02; A47C 27/003; A41D 27/24
See application file for complete search history.

(56) References Cited

U.S. PATENT DOCUMENTS 1,794,159 A * 2/1931 Dinsmore ................ D03D 3/00
139/384 R

FOREIGN PATENT DOCUMENTS

JP    S57166774 U    10/1982
JP    S6063299 U    5/1985
(Continued)

OTHER PUBLICATIONS

Translation of JP 60063299 retrieved Feb. 2017.*
(Continued)

*Primary Examiner* — Alexander Thomas
(74) *Attorney, Agent, or Firm* — Millen, White, Zelano & Branigan, P.C.; William F. Nixon

(57) ABSTRACT

A cover material for a vehicle seat sheet is provided. The cover material for a vehicle seat sheet includes a first fabric, a second fabric, and a decorative piping member. The decorative piping member includes an approximately rectangular seam margin part, a tubular part connected to a widthwise end part of the seam margin part, and a core part arranged in the tubular part in an inserted state. The decorative piping member includes a warp and a weft that both form the tubular part and the seam margin part, and an insertion thread that forms the core part. These are integrally woven with a loom. The seam margin part of the decorative piping member is sandwiched by and between an end part of the first fabric and an end part of the second fabric, and these parts are sewed together in a mutually overlapped state.

6 Claims, 8 Drawing Sheets

(56) References Cited

FOREIGN PATENT DOCUMENTS

JP            2002011268 A     1/2002
JP              3099273 U     4/2004

OTHER PUBLICATIONS

International Search Report for PCT/2015/063060 dated Jul. 7, 2015.
English Abstract for JP2002-011268, Publication Date: Jan. 1, 2002.
English Abstract for JP3099273, Publication Date: Apr. 2, 2004.
Bibliographic Abstract for JP60063299, Publication Date: May 2, 1985.
Bibliographic Abstract of JP57166774, Publication Date: Oct. 20, 1982.

\* cited by examiner

COVER MATERIAL FOR VEHICLE SEAT SHEET

TECHNICAL FIELD

The present invention relates to a cover material for a vehicle seat sheet improved in design with a (piping part of) decorative piping member provided at a seamed part of fabrics.

BACKGROUND ART

As a cover member for an automobile seat sheet, a cover member is known in which a seam margin part of a piping member is sandwiched by and between end parts of two fabrics (surface skin materials) and sewed together in an overlapped state (see, FIG. 1(b) of Patent Document 1).

As the aforementioned piping member, a piping member in which a core member made of a metal wire is wrapped with a two-folded belt-like piping cover is used (see FIG. 1(a) of Patent Document 1).

By providing such a piping member, in an automobile seat sheet, the head part (piping part) of the piping member becomes observable from the outside. Therefore, by making the color of this head part (piping part) different from the color of the surface skin fabric, for example, by employing a black color as the color of the surface skin fabric and also employing a red color as the color of the heat part (piping part) of the piping member, decoration can be imparted to the seat sheet, and the design of the seat sheet can be improved.

PRIOR ART

Patent Document

Patent Document 1: Microfilm of Japanese Utility Model Application No. 56-55557 (Japanese Utility Model Unexamined Application Publication No. S57-166774) (see FIGS. 1(a) and 1(b), Page 2, lines 2 to 4 of Specification)

SUMMARY OF THE INVENTION

Problems to be Solved by the Invention

In the prior art technique, however, in producing the piping member, it requires a cutting process for producing an elongated belt-like piping cover by cutting, and a covering and bonding process for covering a core material with a two-folded belt-like piping cover obtained by folding the piping cover into two and bonding overlapped both end portions (portions to become seam margins) of the piping cover as shown in FIG. 1(b) of Patent Document 1. Therefore, the productivity was poor.

Furthermore, a work for covering the core material with the two-folded belt-like piping cover and a work for bonding them are manual works, and therefore there was a problem that it was unable to provide a piping member with uniform quality (i.e., quality fluctuates).

The present invention was made in view of the aforementioned technical background, and aims to provide a cover material for a vehicle seat sheet excellent in productivity as well as excellent in design due to a decorative piping member observable from an outside in an attractive state.

Means for Solving Problems

To attain the aforementioned object, the present invention provides the following means.

[1] A cover material for a vehicle seat sheet, comprising:
a first fabric;
a second fabric; and
a decorative piping member,
wherein the decorative piping member includes an approximately rectangular seam margin part, a tubular part connected to a widthwise end part of the seam margin part, and a core part arranged inside the tubular part in an inserted manner,
wherein the decorative piping member includes a warp that forms the seam margin part and the tubular part, a weft that forms the seam margin part and the tubular part, and an insertion thread that forms the core part, wherein the warp, the weft, and the insertion thread are integrally woven with a loom, and
wherein the seam margin part of the decorative piping member is sandwiched by and between an end part of the first fabric and an end part of the second fabric, wherein the seam margin part, the end part of the first fabric, and the end part of the second fabric are sewed together in a mutually overlapped state.

[2] The cover material for a vehicle seat sheet as recited in the aforementioned Item [1],
wherein the insertion thread is constituted by a thread of 84 decitex to 15,000 decitex.

[3] The cover material for a vehicle seat sheet as recited in the aforementioned Item [1] or [2],
wherein the insertion thread is a polyester stretched multifilament thread.

[4] The cover material for a vehicle seat sheet as recited in any one of the aforementioned Items [1] to [3],
wherein as the warp, a thread of 33 decitex to 1,000 decitex is used, and
wherein as the weft, a thread of 33 decitex to 1,000 decitex is used.

[5] A decorative piping member comprising:
an approximately rectangular seam margin part;
a tubular part connected to a widthwise end part of the seam margin part; and
a core part arranged inside the tubular part in an inserted manner,
wherein the decorative piping member includes a warp that forms the seam margin part and the tubular part, a weft that forms the seam margin part and the tubular part, and an insertion thread that forms the core part, wherein the warp, the weft, and the insertion thread are integrally woven with a loom.

Effects of the Invention

In the invention as recited in the aforementioned Item [1], the decorative piping member includes a warp that forms the seam margin part and the tubular part, a weft that forms the seam margin part and the tubular part, and an insertion thread that forms the core part, wherein the warp, the weft, and the insertion thread are integrally woven with a loom. Therefore, there are merits that the productivity can be improved significantly, and the quality as a decorative piping member can be equalized. That is, the seam margin part and the tubular part can be formed simultaneously by weaving with a single loom, and the insertion arrangement of the insertion thread (core part) inside the tubular part can be performed simultaneously (in parallel) (see FIG. 3), and therefore the productivity can be improved significantly, and the quality as a decorative piping member can also be equalized. Accordingly, in the cover material, the tubular part (piping part) of the decorative piping member can be observed in an attractive state, and is excellent in design.

In the invention as recited in the aforementioned Item [2], the insertion thread is constituted by a thread of 84 decitex to 15,000 decitex. Therefore, the exterior design of the piping part (the tubular part in which the insertion thread is arranged) can be improved, and even when seated in a state of being in contact with the piping part, it is possible to sufficiently improve the seating comfort without causing uncomfortableness (stiffness, etc.). Accordingly, it becomes possible to apply to a portion (position) which comes into contact with a human body when seated.

In the invention as recited in the aforementioned Item [3], the insertion thread is constituted by a polyester stretched multifilament thread. Therefore, the elasticity of the core part can be improved, and even when seated in a state of being in contact with the tubular part (piping part) of the decorative piping member, it is possible to further improve the seating comfort without causing uncomfortableness (stiffness, etc.). Accordingly, it becomes sufficiently possible to apply to a portion (position) which comes into contact with a human body when seated.

In the invention as recited in the aforementioned Item [4], as the warp, a thread of 33 decitex to 1,000 decitex is used, and as the weft, a thread of 33 decitex to 1,000 decitex is used. Therefore, the strength of the seam margin part and that of the tubular part can be improved. Accordingly, the durability of the tubular part exposed to the surface of the seat sheet cover material can be improved.

The decorative piping member of the invention as recited in the aforementioned Item [5] is formed by integrally weaving a warp that forms the seam margin part and the tubular part, a weft that forms the seam margin part and the tubular part, and an insertion thread that forms the core part with a loom. Therefore, there are merits that the productivity can be improved significantly, and the quality as a decorative piping member can be equalized. That is, the seam margin part and the tubular part can be formed simultaneously by weaving with a single loom, and the insertion arrangement of the insertion thread (core part) inside the tubular part can be performed simultaneously (in parallel) (see FIG. 3). Therefore, the productivity can be improved significantly, and the quality as a decorative piping member can also be equalized.

BRIEF DESCRIPTION OF THE DRAWINGS

FIGS. 6A and 6B are plan views showing a test piece to be subjected to a Taber scratch test, wherein FIG. 6A is a plan view of a first test piece, and FIG. 6B is a plan view of a second test piece.

FIGS. 7A and 7B are plan views showing a test piece to be subjected to a Mace snagging test, wherein FIG. 7A is a plan view of a first test piece, and FIG. 7B is a plan view of a second test piece.

FIGS. 8A and 8B are plan views showing a test piece to be subjected to a hook-and-loop fastener type scratch test, wherein FIG. 8A is a plan view of a first test piece, and FIG. 8B is a plan view of a second test piece.

FIGS. 9A and 9B are plan views showing a test piece to be subjected to a friction durability test, wherein FIG. 9A is a plan view of the first test piece and FIG. 9B is a plan view of the second test piece.

EMBODIMENTS FOR CARRYING OUT THE INVENTION

Figure 1:
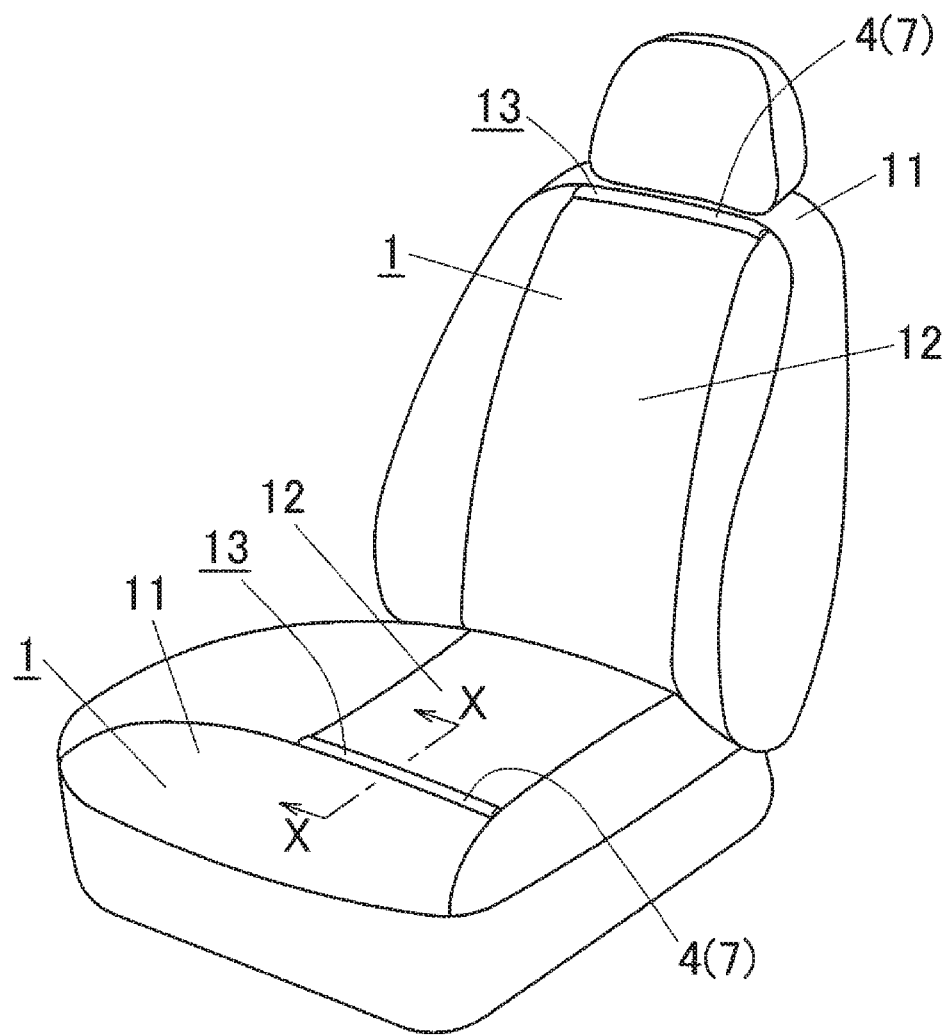
FIG. 1 is a perspective view showing an automobile seat sheet constituted by a cover material for a vehicle seat sheet according to the present invention.
Figure 5:
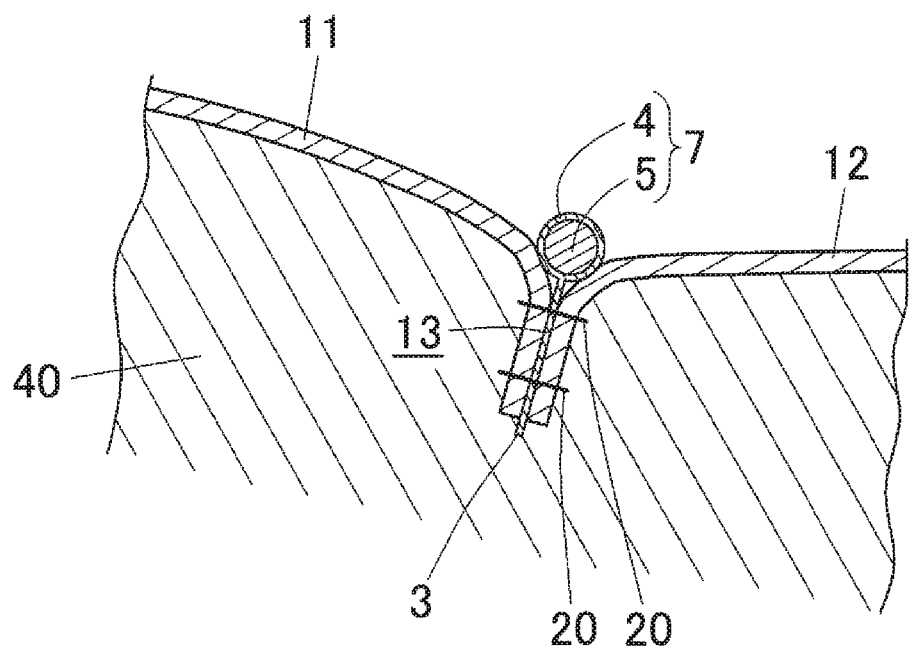
FIG. 5 is a cross-sectional view taken along the line X-X in FIG. 1.

A state in which a cover material 1 for a vehicle seat sheet according to one embodiment of the present invention is equipped to a vehicle seat sheet is shown in FIG. 1. A partial cross-sectional view in this equipped state is shown in FIG. 5.

The cover material 1 for a vehicle seat sheet according to the present invention is equipped with at least a first fabric 11, a second fabric 12, and a decorative piping member 13 (see, FIGS. 1, 2, 4, and 5).

Figure 2:
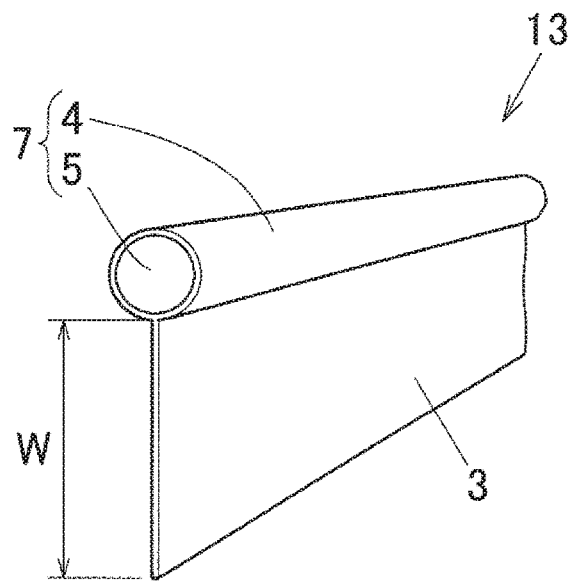
FIG. 2 is a perspective view of a decorative piping member.

As shown in FIG. 2, the decorative piping member 13 is configured to include an approximately rectangular seam margin part 3, a tubular part 4 connected to a widthwise end part of the seam margin part 3, and a core part (insertion thread) 5 arranged inside the tubular part 4 in an inserted manner. The core part (insertion thread) 5 and the tubular part 4 form a piping part 7 (see, FIGS. 2 and 4). Further, the seam margin part 3 and the tubular part 4 form a woven part 2 (see, FIG. 3).

The decorative piping member 13 is formed by integrally weaving warps 31 that form the seam margin part 3 and the tubular part 4, a weft 32 that forms the seam margin part 3 and the tubular part 4, and an insertion thread 33 that forms the core part 5 with a single loom. The tubular part 4 is also constituted by a woven structure.

Figure 3:
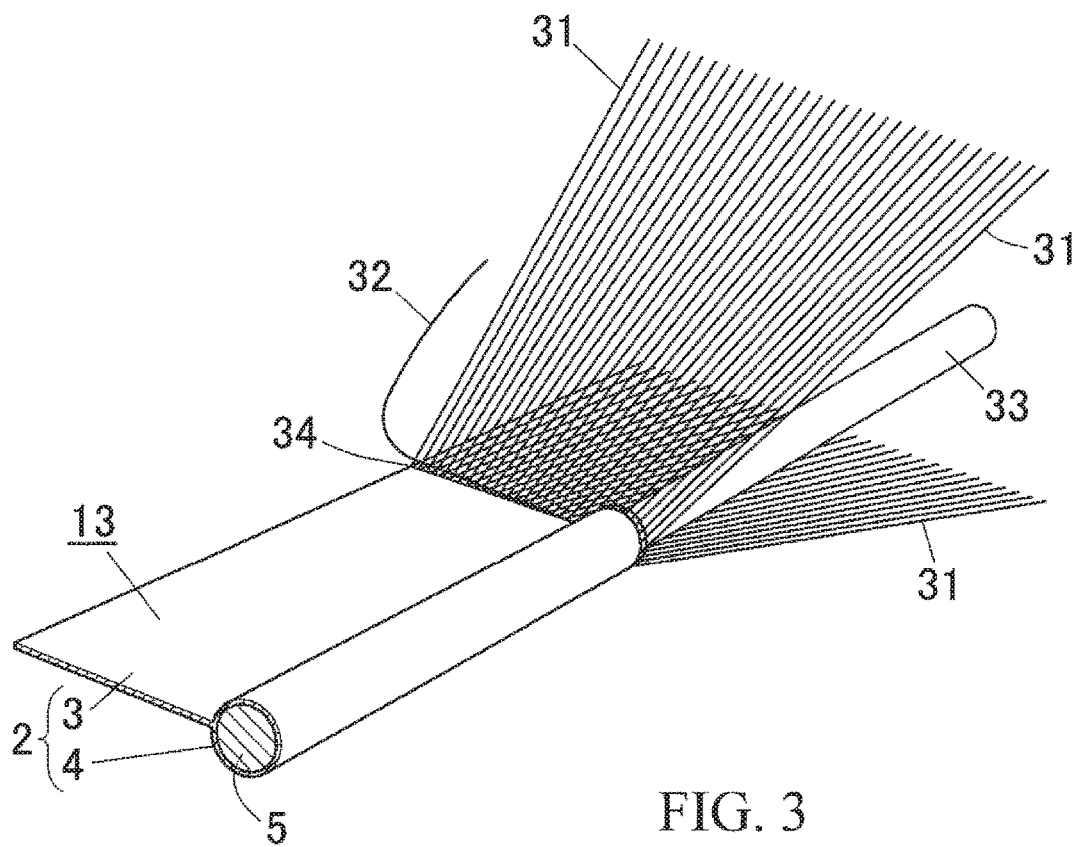
FIG. 3 is a schematic explanatory perspective view of a weaving method of the decorative pipe member showing a state in which the decorative piping member is being woven.

An example of a weaving method of the decorative piping member 13 is shown in FIG. 3. As shown in FIG. 3, a number of warps 31 are supplied toward a weaving position 34 from an obliquely upper side, and a number of warps 31 are supplied toward the weaving position 34 from an obliquely lower side. Further, an insertion thread 33 is also supplied from a rear side (thread supplying side) between a group of the warps 31 supplied from the obliquely upper side and a group of the warps 31 supplied from the obliquely lower side. At the weaving position 34, the seam margin part 3 and the tubular part 4 are woven with the warps 31 supplied from the obliquely upper side, the warps 31 supplied from the obliquely lower side, and the weft 32. At the same time, the insertion thread 33 is arranged inside the tubular part 4 in an inserted manner. Thus, a decorative piping member 13 shown in FIG. 2 is obtained. Since this decorative piping member 13 is produced by the aforementioned weaving method, it is a non-cut product and a non-sewed product, and no adhesive is used (applied). That is, the decorative piping member 13 is produced by the aforementioned weaving method, and therefore no cutting process is required, and no sewing process is required, and no bonding with adhesive is required. Accordingly, the decorative piping member 13 is extremely excellent in productivity and its quality is equalized since it is obtained by a weaving process.

Figure 4:
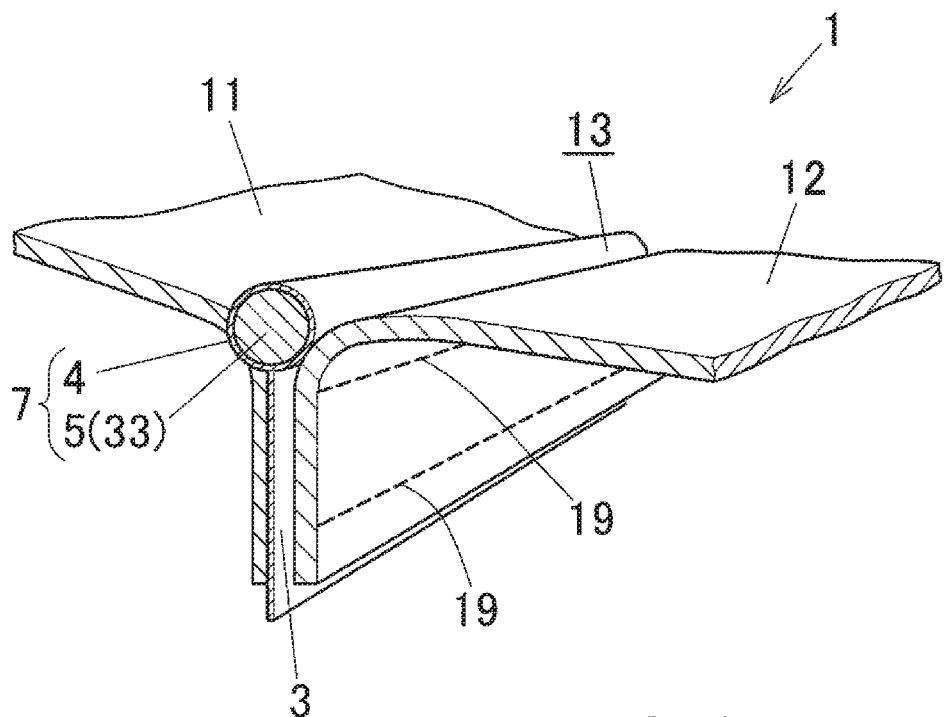
FIG. 4 is a perspective view showing a state in which the decorative piping member is sandwiched by and between an end part of a first fabric and an end part of a second fabric and these end parts and a seam margin part of the piping member are being sewed together.

The seam margin part 3 of the decorative piping member 13 is sandwiched by and between an end part of the first fabric 11 and an end part of the second fabric 12 and sewed together in the order of the end part of the first fabric 11, the seam margin part 3, and the end part of the second fabric 12 in a mutually overlapped state (see FIG. 4). In FIG. 4, the reference numeral "19" denotes a seaming (sewing) scheduled portion. In this embodiment, there are two seaming scheduled portions (seaming scheduled lines) 19 arranged in parallel apart from each other (see, FIG. 4).

At the two seaming scheduled portions (seaming scheduled lines) 19, seaming (sewing) is performed to form a seamed portion 20 (see FIG. 5). Thus, a cover material 1 for a vehicle seat sheet is obtained. This cover material 1 is provided (arranged) in a state of covering the surface of the seat cushion body 40 (see FIG. 5). Thus, a vehicle seat sheet is constituted.

In the cover material 1 for an automobile seat sheet, a part of the tubular part 4 (piping part 7) of the decorative piping member 13 is observable from the outside (see FIGS. 1 and 5). The tubular part 4 (piping part 7) of the decorative piping member 13 is observable from the outside in a linear shape (line shape) as shown in FIG. 1. Therefore, for example, by designing the tubular part 4 to have a color different from the color of the first and second fabrics 11 and 12, the observable tubular part 4 (piping part 7) becomes a design accent to thereby impart an excellent design. In this embodiment, the first fabric 11 is a fabric constituting a side material among the cover material 1, and the second fabric 12 is a fabric constituting a main material (seat portion material or backrest portion material) among the cover material 1. Further, in this embodiment, as shown in FIGS. 4 and 5, a part (upper part) of the piping part 7 (tubular part 4) is arranged higher than (i.e., protruded from) the surface position of the first and second fabrics 11 and 12.

As the insertion thread, for example, a resin thread, such as, e.g., a polyester stretched multifilament thread, a vinyl chloride thread, and a polyethylene thread, can be exemplified. Among other things, as the insertion thread, it is preferable to use a polyester stretched multifilament thread. In this case, even when seated in a state of being in contact with the piping part 7, it is possible to sufficiently improve the seating comfort without causing uncomfortableness (stiffness, etc.).

As the insertion thread 33, it is preferable to use a thread of 84 decitex to 15,000 decitex. By using a thread of 84 decitex (dtex) or more, it is possible to sufficiently secure the design effect by the piping part 7, and by using a thread of 15,000 decitex (dtex) or less, it is possible to sufficiently improve the seating comfort without causing uncomfortableness (stiffness, etc.) even when seated in a state of being in contact with the piping part 7. Among other things, as the insertion thread 33, it is especially preferable to use a thread of 2,000 decitex to 10,000 decitex.

As the warp, it is preferable to use a thread of 33 decitex to 1,000 decitex. In this case, it is possible to improve the strength of the seam margin part 3 and the tubular part 4.

As the warp, it is preferable to use a twisted thread with the number of twists of 100 to 350. Further, the interlace condition of the warp is preferably within a range of 50 piece/m to 150 piece/m.

As the weft, it is preferable to use a thread of 33 decitex to 1,000 decitex. In this case, it is possible to improve the strength of the seam margin part 3 and the tubular part 4.

As the structure of the seam margin part 3, although not limited, for example, a plain woven structure, a twill woven structure, a satin woven structure, etc., can be exemplified. Among other things, the structure of the seam margin part 3 is preferably a plain woven structure. The width W of the seam margin part 3 is preferably set to 5 mm to 100 mm (see FIG. 2). Among other things, the width W of the seam margin part 3 is especially preferably set to 7 mm to 50 mm.

As the structure of the tubular part 4, although not limited, for example, a hollow woven structure (structure in which warps are woven into a bag-shape with the warps dispersed up and down on the front and back) can be exemplified.

As the first fabric 11 and the second fabric 12, although not limited, for example, a dobby fabric (dobby fabrics made of polyester fibers, etc.), a jacquard fabric (jacquard fabric made of polyester fibers, etc.), a tricot (tricot made of polyester fibers, etc.), a circular knitted fabric (round knitted fabric made of polyester fibers, etc.), and a Russell fabric (Russell cloth made of polyester fibers, etc.) can be exemplified.

As a sewing (seaming) thread used for sewing (seaming), although not limited, for example, a polyester spun thread, etc., can be exemplified. It is preferable that the sewing (seaming) thread have a thickness of 4 count to 12 count.

In the above-described embodiment, in the cover material 1 in which the seam margin part 3 of the decorative piping member 13 is sandwiched by and between an end part of the first fabric 11 and an end part of the second fabric 12 and sewed (seamed) together in a mutually overlapped state, the tubular part 4 (piping part 7) which is observable from the outside is formed into an approximately linear shape (including a linear shape) (see, FIGS. 1 and 4). However, the shape of the tubular part 4 (piping part 7) which is observable from the outside is not specifically limited to the above-described shape, and may be a non-linear shape including various curved shapes, such as, e.g., a circular arc shape, a part of an elliptical shape, a gentle wavy shape, a circular shape, and an elliptical shape.

However, in cases where the tubular part 4 (piping part 7) of the decorative piping member 13 is formed into a curved shape, such as, e.g., a circular arc shape, when the end part of the first fabric 11, the seam margin part 3, and the end part of the second fabric 12 are sewed (seamed) together in this order in a mutually overlapped state, winkles (bumpy wrinkles) tend to occur at the sewed portion. For this reason, the tubular part 4 (piping part 7) positioned above the sewed (seamed) portion cannot absorb the wrinkles and tends to be formed into a curved shape, such as, e.g., a slightly bumpy circular arc shape (the tubular part 4 is hardly formed into a smoothly curved shape).

Figure 10:
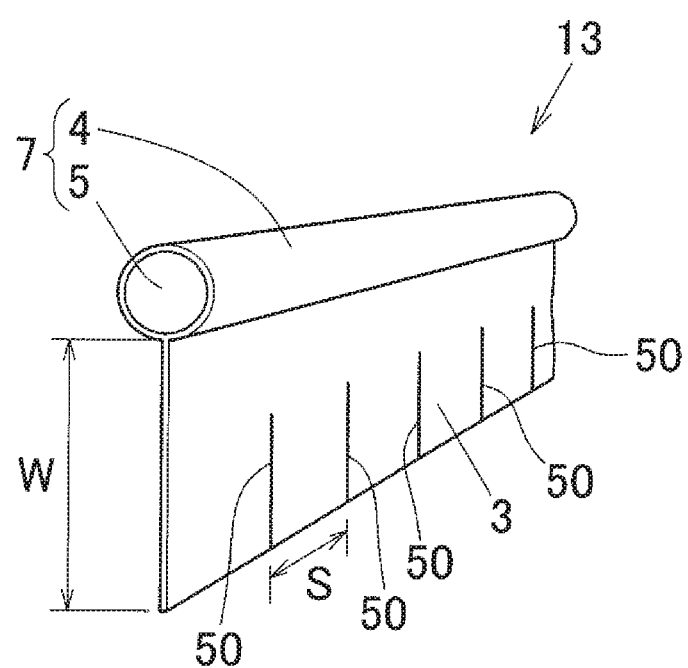
FIG. 10 is a perspective view showing another embodiment of a decorative piping member.

In the cover material 1 for a vehicle seat sheet of the present invention, in cases where the tubular part 4 (piping part 7) of the decorative piping member 13 is formed into a curved shape, in order to form into such a smooth curved shape (a circular arc shape, a part of an elliptical shape, a gentle wavy shape, a circular shape, an elliptical shape, etc.), as shown in FIG. 10, it is preferably configured such that one or a plurality of cuts 50 are formed in the seam margin part 3 of the decorative piping member 13. The cut (slit) 50 is formed in parallel to the widthwise direction of the seam margin part 3 (see FIG. 10). In FIG. 10, the cut (cut line part) 50 is formed from an edge opposite to the tubular part side in the widthwise direction to the widthwise center portion.

The cut 50 is not always required to be formed from the widthwise one end side of the seam margin part 3 to the other end side. It is enough that the cut 50 is formed at least at the position to be sewed (seamed) (position to be sewed (seamed) together with a sewing (seaming) thread) or its vicinity. Therefore, for example, the cut 50 can be formed only at the widthwise center portion of the seam margin part 3. By providing such a cut 50 in the seam margin part 3, the sewing (seaming) thread (sewed (seamed) portion) 20 and the cut (cut line portion) 50 become in a crossed-state (e.g., intersected with each other in an approximately orthogonal state). With this, the tubular part 4 (piping part 7) is formed into a non-bumpy smooth curved shape.

The distance S between adjacent cuts 50 is preferably set to 5 mm to 100 mm. Among other things, it is especially preferably set to 8 mm to 20 mm.

EXAMPLES

Next, specific examples of the present invention will be described. It should be noted, however, that the present invention is not especially limited to these examples.

Example 1

A decorative piping member 13 shown in FIG. 2 was obtained by weaving by the weaving method shown in FIG. 3 under the following design, conditions, etc.
 Loom: narrow width needle loom
 Warp density: 374 pieces/2.54 cm
 Weft density: 259 pieces/2.54 cm
 Warp: polyester multifilament thread of 167 decitex (twisted thread: the number of twists was 180)
 Weft: polyester multi-filament thread of 84 decitex
 Insertion thread: polyester stretched multifilament thread (6948 decitex)
 Structure of the seam margin part: plain woven structure
 Width W of the seam margin part: 10 mm
 Structure of the tubular part: bag-shaped structure Next, as shown in FIG. 4, in a state in which a seam margin part 3 of the decorative piping member 13 is sandwiched by and between an end part of a first fabric 11 made of a dobby fabric made of polyester fibers and an end part of a second fabric 12 made of a dobby fabric made of polyester fibers in an overlapped state, these were sewed (seamed) together with polyester spun threads (two sewing (seaming) lines 20 as shown in FIG. 5). Thus, a cover material 1 for an automobile seat sheet shown in FIGS. 1 and 5 was obtained. In the obtained cover material 1 for an automobile seat sheet, a part (upper part) of the tubular part 4 (piping part 7) of the decorative piping member 13 was observable from the outside (see FIGS. 1 and 5).

Example 2

A decorative piping member 13 shown in FIG. 2 was obtained by weaving by the weaving method shown in FIG. 3 under the following design, conditions, etc.
 Loom: narrow width needle loom
 Warp density: 238 pieces/2.54 cm
 Weft density: 264 pieces/2.54 cm
 Warp: polyester multi-filament thread of 167 decitex (twisted thread: the number of twists was 180)
 Weft: polyester multi-filament thread of 167 decitex
 Insertion thread: polyester stretched multifilament thread (6,320 decitex)
 Structure of the seam margin part: plain woven structure
 Width W of the seam margin part: 10 mm
 Structure of the tubular part: bag-shaped structure Next, as shown in FIG. 4, in a state in which a seam margin part 3 of the decorative piping member 13 is sandwiched by and between an end part of a first fabric 11 made of a dobby fabric made of polyester fibers and an end part of a second fabric 12 made of a dobby fabric made of polyester fibers in an overlapped state, these were sewed (seamed) together with polyester spun threads (two sewing lines 20 as shown in FIG. 5). Thus, a cover material 1 for an automobile seat sheet shown in FIGS. 1 and 5 was obtained. In the obtained cover material 1 for an automobile seat sheet, a part (upper part) of the tubular part 4 (piping part 7) of the decorative piping member 13 was observable from the outside (see FIGS. 1 and 5).

For each cover material for an automobile seat sheet obtained as described above, evaluations were performed based on the following evaluation method. These results are shown in Table 1.

TABLE 1

| | | Example 1 | Example 2 |
|---|---|---|---|
| Taber scratch test | First test piece (FIG. 6A) | Level 3 to 4 | Level 4 |
| | Second test piece (FIG. 6B) | Level 3 to 4 | Level 4 |
| Mace snagging test | First test piece (FIG. 7A) | Level 4 | Level 4 |
| | Second test piece (FIG. 7B) | Level 4 | Level 4 |
| Hook-and-loop fastener type scratch test | First test piece (FIG. 8A) | Level 4 | Level 4 |
| | Second test piece (FIG. 8B) | Level 4 | Level 4 |
| Friction durability test | First test piece (FIG. 9A) | Level 4 | Level 4 |
| | Second test piece (FIG. 9B) | Level 4 | Level 4 |

<Surface Durability Evaluation Method of Cover Material>
[Taber Scratch Test]

Figure 6A:
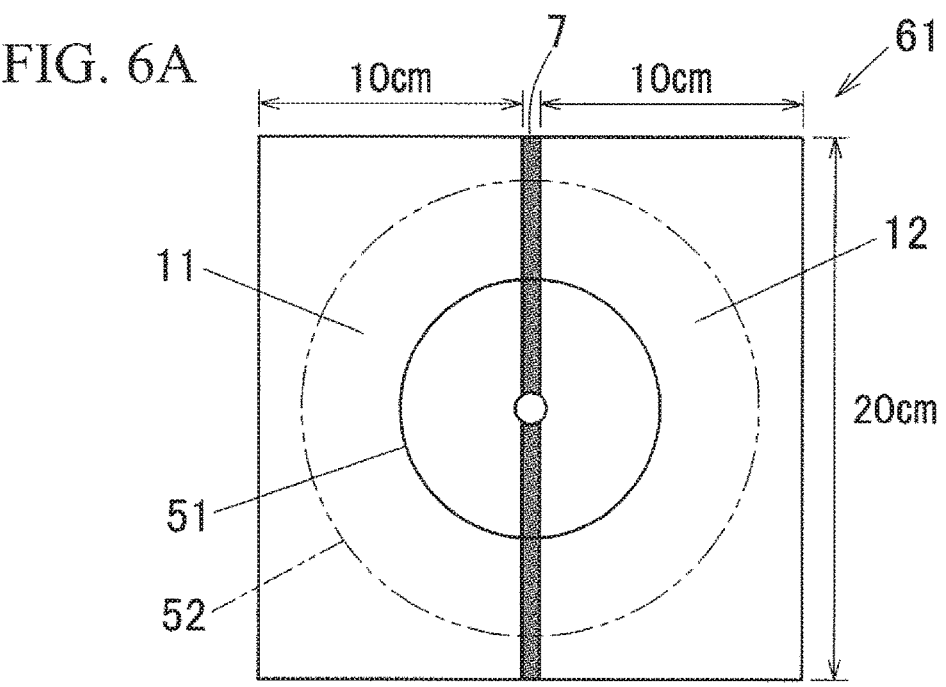
Figure 6B:
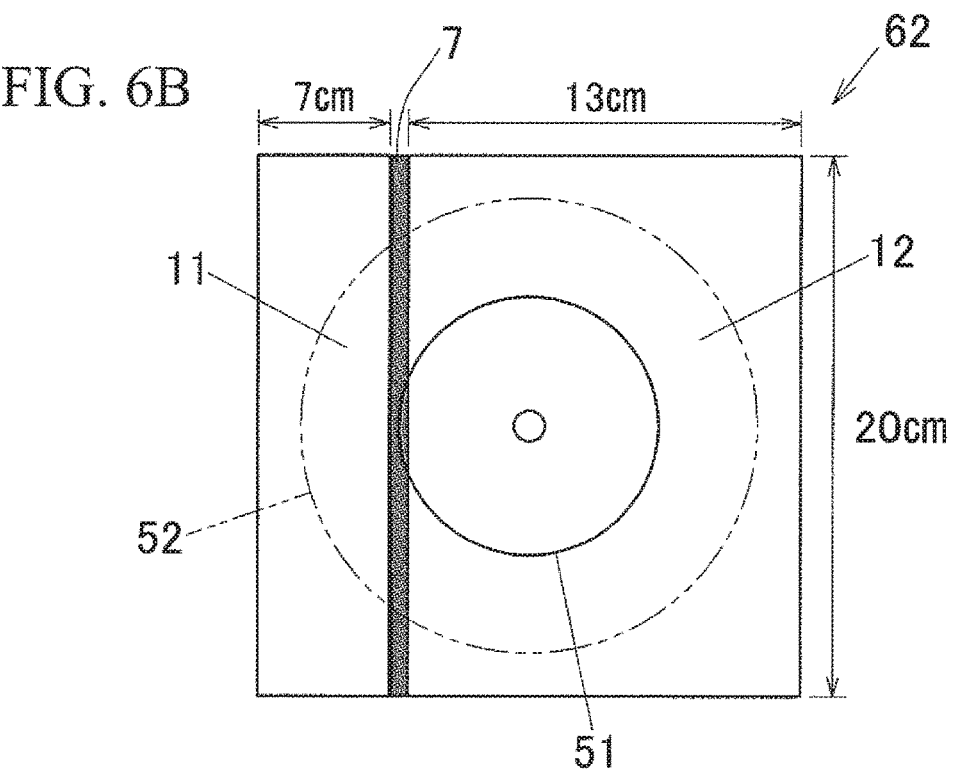

A first test piece 61 having the shape and the size shown in FIG. 6A and a second test piece 62 having the shape and the size shown in FIG. 6B were obtained by cutting the obtained cover material for an automobile seat sheet. Further, it was cut along a circular cutting line (two-dot chain line) 52 into a circular shape. Next, a needle was attached to a Taber scratch test machine, and in a state in which the needle tip of the needle (the tip end of the needle) was in contact with the surface (piping part 7 exposed surface) of each test piece and a load of 200 g was applied, the test piece was rotated twice at a rotation speed of 1 rpm. The circular solid line 51 in FIGS. 6A and 6B shows a contact orbit of the needle tip. After the test, the nature of the surface of each test piece was observed visually, and evaluated based on the following judgment criteria. Level 3, Level 4, and Level 5 were evaluated as "pass".
(Judgment Criteria)
 Level 5—No damage was observed at all.
 Level 4—Although there were some damages due to the scratching, but no protrusion of threads was observed.
 Level 3—Although there were some protrusions of threads, they were hard to be noticeable. Although some threads were cut, they were hard to be noticeable.
 Level 2—There were some protrusions of threads, they were noticeable. Threads were cut, and they were noticeable.
 Level 1—There were some protrusions of threads, they were very noticeable. Threads were cut and broken.
[Mace Snagging Test]

Figure 7A:
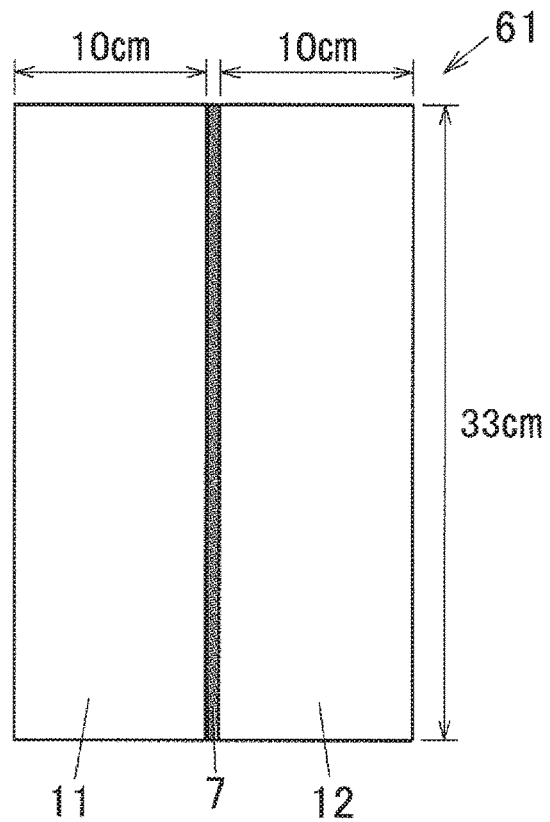
Figure 7B:
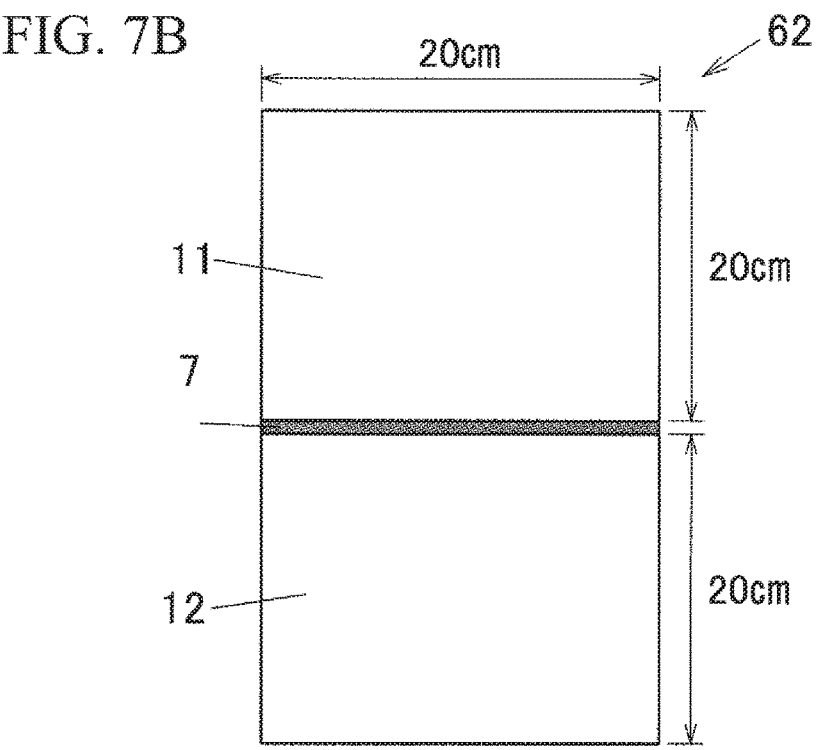

Two first test pieces 61 each having the shape and the size shown in FIG. 7A and two second test pieces 62 each having the shape and the size shown in FIG. 7B were obtained by cutting the obtained cover material for an automobile seat sheet. Two first test pieces were sewed with the surfaces (piping part exposed surfaces) facing inward to obtain a cylindrical member (in a manner such that the lines of the piping parts 7 are parallel to the center axis of the cylindrical member), and then the cylindrical member was reversed. Thus, a cylindrical first test piece in which the surfaces of the first test pieces (piping part exposed surfaces) were exposed outward was obtained. In the same manner, two second test pieces were sewed with the surfaces (piping part exposed surfaces) facing inward to obtain a cylindrical member (in a manner such that the lines of the piping parts 7 were parallel to the center axis of the cylindrical member), and then the cylindrical member was reversed. Thus, a cylindrical second test piece in which the surfaces of the second test pieces (piping part 7 exposed surfaces) were exposed outward was obtained. Using an ICI type Mace testing machine defined by JIS L1058-2005, each cylindrical test piece was mounted on the outer surface of a rotary shaft body of the Mace testing machine. The rotary shaft body was rotated 100 times at a rotary rate of 60 rpm. Thus, a snagging test was executed against the outer peripheral surface (piping part 7 exposed surface) of the cylindrical test piece. After the test, the nature of the surface of each test piece was observed visually, and evaluated based on the following judgment criteria. It was evaluated such that Level 3, Level 4, and Level 5 were passed.

(Judgment Criteria)

Level 5—No generation of snag (protrusion of threads) was recognized at all.

Level 4—Although there were some damages due to the snagging (protrusion of threads), but there was no protrusion of threads.

Level 3—Although there were some protrusions of threads, the number thereof was small. Although threads were cut, they were hard to be noticeable.

Level 2—There were protrusions of threads, and the number was many. Threads were cut, and they were noticeable.

Level 1—Protrusions of threads were remarkably noticeable, and the number thereof was large. The fibers were cut and broken.

[Hook-and-Loop Fastener Type Scratch Test]

Figure 8A:
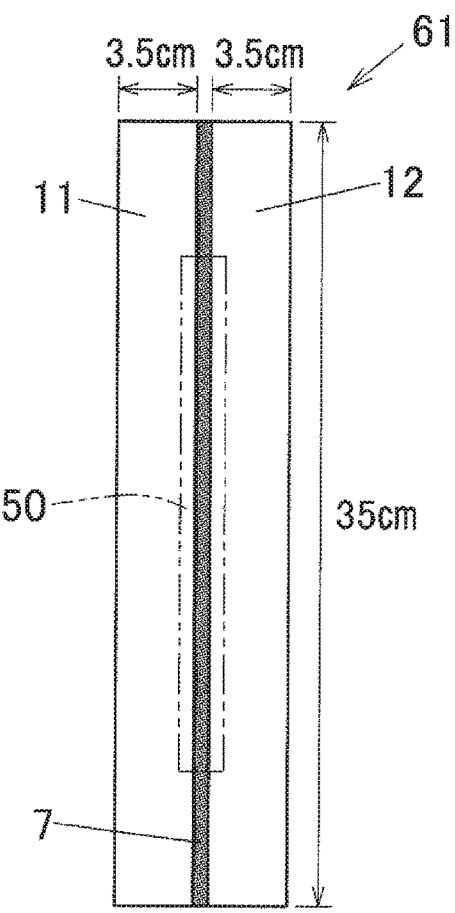
Figure 8B:
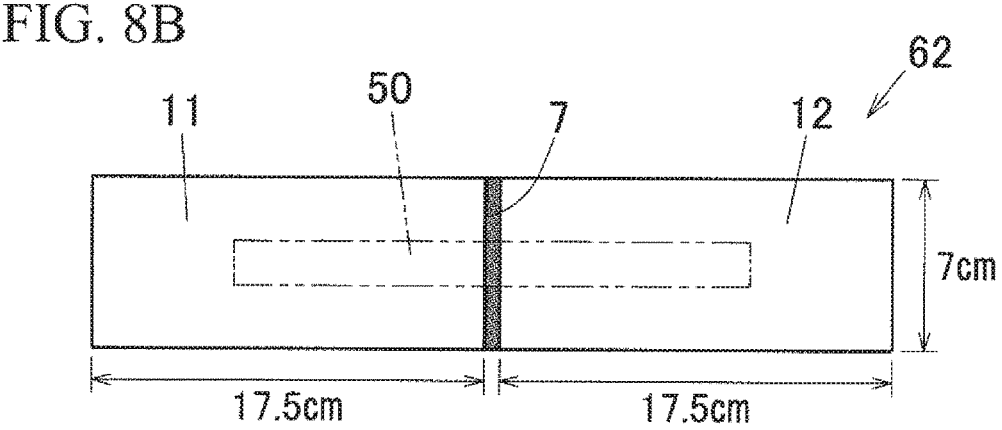

A first test piece 61 having the shape and the size shown in FIG. 8A and a second test piece 62 having the shape and the size shown in FIG. 8B were obtained by cutting the obtained cover material for an automobile seat sheet. Using a friction testing machine I type defined by JIS L0849-2004, as a friction piece, a friction piece rolled up with a hook-and-loop faster in which the friction surface faces the front surface (with hooks) was used. And, the friction piece was reciprocated 10 times between points apart from each other by a distance of 150 mm under a load of 8.0 N at the rate of 60 times per minute. The region surrounded by the two-dot chain line in FIGS. 8A and 8B was a reciprocate region 50 of the friction piece. After the 10 reciprocations, the degree of fluffing on the surface of each test piece was observed visually, and evaluated based on the following judgment criteria. It was evaluated such that Level 3, Level 4, and Level 5 were passed.

(Judgment Criteria)

Level 5—No fluffing was observed at all.

Level 4—Although there were some fluffing, but there was no fiber cut.

Level 3—Although there were some fluffing, there was hard to be noticeable, and there was fiber cuts, which were hard to be noticeable.

Level 2—There were noticeable fluffing, and fibers were cut, which was noticeable.

Level 1—Fluffing was noticeable, and fibers were cut, which was noticeable, or fibers were broken.

[Friction Durability Test]

Figure 9A:
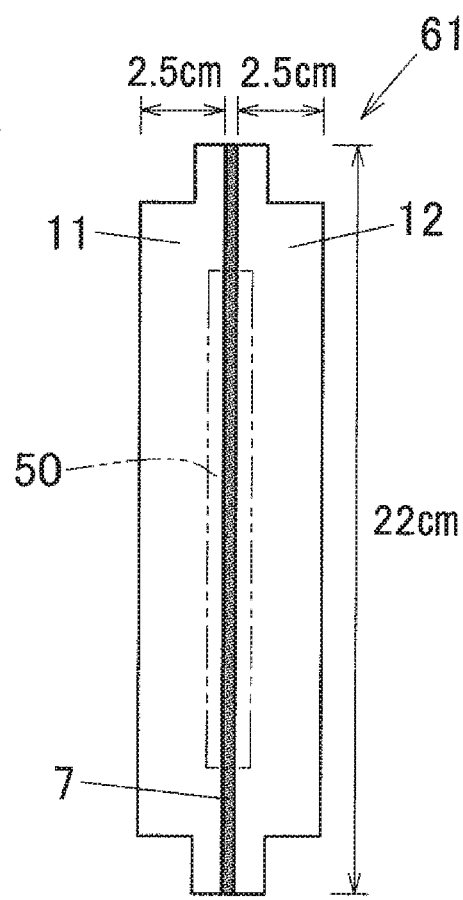
Figure 9B:
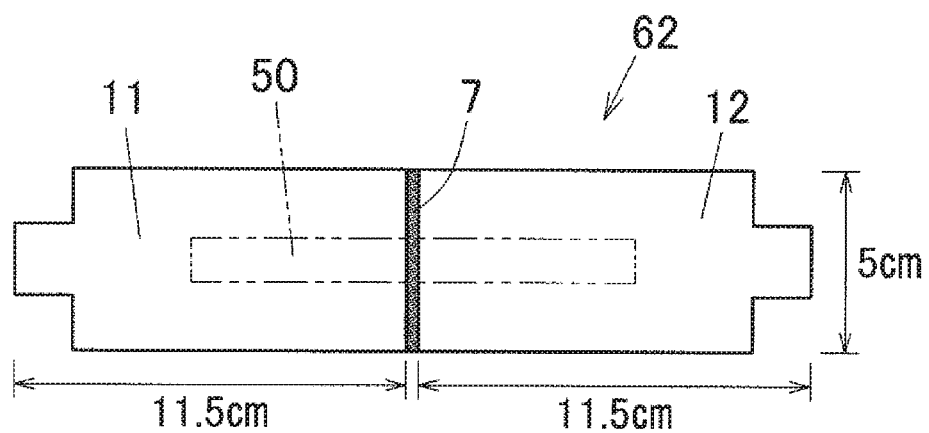

A first test piece 61 having the shape and the size shown in FIG. 9A and a second test piece 62 having the shape and the size shown in FIG. 9B were obtained by cutting the obtained cover material for an automobile seat sheet. Using a friction testing machine II type defined by JIS L0849-2004, a cotton canvas No. 10 was used as a friction piece, and was reciprocated 3,000 times under a load of 5 N between points apart from each other by a distance of 100 mm at a reciprocate rate of 30 times per minute. The region surrounded by the two-dot chain line in FIGS. 9A and 9B was a reciprocate region 50 of the friction piece. After the 3,000 reciprocations, the degree of abrasion of the surface of each test piece was observed visually, and the friction durability was evaluated based on the following judgment criteria. It was evaluated such that Level 3, Level 4, and Level 5 were passed.

(Judgment Criteria)

Level 5—No abrasion and no appearance change were observed.

Level 4—Slight abrasion and slight appearance change were observed.

Level 3—Although abrasion and appearance change were observed, it was a level causing no practical problem.

Level 2—Abrasion and appearance change were significant.

Level 1—Abrasion and appearance change were extremely significant.

As will be apparent from Table 1, the cover material for an automobile seat sheet according to each of Examples 1 and 2 of the present invention was evaluated as "pass", and the surface durability was excellent.

INDUSTRIAL APPLICABILITY

The cover material 1 for a vehicle seat sheet according to the present invention can be preferably used as a cover material for an automobile seat sheet, but not limited to such application.

The present application claims priority to Japanese Patent Application No. 2014-95956 filed on May 7, 2014, the entire disclosure of which is incorporated herein by reference in its entirety.

It should be understood that the terms and expressions used herein are used for explanation and have no intention to be used to construe in a limited manner, and allow various modifications falling within the claimed scope of the present invention.

DESCRIPTION OF REFERENCE NUMERAL

1 cover material for a vehicle seat sheet
2 woven part
3 seam margin part
4 tubular part
5 core part (insertion thread)
7 piping part
11 first fabric
12 second fabric
13 decorative piping member
19 seaming scheduled portion
20 seamed portion (sewing line)
31 warp 32 weft
33 insertion thread

The invention claimed is:

1. A cover material for a vehicle seat sheet, comprising:
a first fabric;
a second fabric; and
a decorative piping member,
wherein the decorative piping member includes an approximately rectangular seam margin part, a tubular part connected to a widthwise end part of the seam margin part, and a core part arranged inside the tubular part in an inserted manner,
wherein the decorative piping member includes a warp that forms the seam margin part and the tubular part, a weft that forms the seam margin part and the tubular part, and an insertion thread that forms the core part, wherein the warp, the weft, and the insertion thread are integrally woven with a loom,
wherein the insertion thread is constituted by a polyester stretched multifilament thread of 2,000 decitex to 15,000 decitex, and
wherein the seam margin part of the decorative piping member is sandwiched by and between an end part of the first fabric and an end part of the second fabric, wherein the seam margin part, the end part of the first fabric, and the end part of the second fabric are sewed together in a mutually overlapped state.

2. The cover material for a vehicle seat sheet as recited in claim 1,
wherein as the warp, a thread of 33 decitex to 1,000 decitex is used, and
wherein as the weft, a thread of 33 decitex to 1,000 decitex is used.

3. The cover material for a vehicle seat sheet as recited in claim 1, wherein the tubular part is a first color and the first fabric or the second fabric is a second color.

4. The cover material for a vehicle seat sheet as recited in claim 1, wherein the seam margin part is sandwiched between the end part of the first fabric and the end part of the second fabric and sewn together using at least one seaming schedule portion.

5. The cover material for a vehicle seat sheet as recited in claim 1, wherein a portion of the decorative piping member has a curved shape.

6. The cover material for a vehicle seat sheet as recited in claim 5, wherein the portion having the curved shape includes at least one cut formed in the seam margin part at an edge opposite the tubular part.

* * * * *